United States Patent
Baig et al.

(10) Patent No.: US 12,206,482 B2
(45) Date of Patent: Jan. 21, 2025

(54) BEAM MANAGEMENT FOR USER EQUIPMENT IN A NETWORK

(71) Applicant: Telefonaktiebolaget LM Ericsson (publ), Stockholm (SE)

(72) Inventors: Irfan Baig, Lund (SE); Karol Krakowiak, Lund (SE); Bhavinkumar Patel, Malmö (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 31 days.

(21) Appl. No.: 18/002,167

(22) PCT Filed: Jun. 22, 2020

(86) PCT No.: PCT/EP2020/067316
§ 371 (c)(1),
(2) Date: Dec. 16, 2022

(87) PCT Pub. No.: WO2021/259444
PCT Pub. Date: Dec. 30, 2021

(65) Prior Publication Data
US 2023/0224015 A1 Jul. 13, 2023

(51) Int. Cl.
*H04B 7/06* (2006.01)
*H04B 7/08* (2006.01)

(52) U.S. Cl.
CPC ........... *H04B 7/0695* (2013.01); *H04B 7/088* (2013.01)

(58) Field of Classification Search
CPC .............................. H04B 7/0695; H04B 7/088
USPC ................. 375/262, 267, 299, 347–349
See application file for complete search history.

(56) References Cited

U.S. PATENT DOCUMENTS

| | | | |
|---|---|---|---|
| 10,447,375 B1 | 10/2019 | Padhy et al. | |
| 11,140,567 B2 * | 10/2021 | Tsai | H04W 24/10 |
| 2018/0288645 A1 * | 10/2018 | Lee | H04B 17/382 |
| 2019/0182007 A1 * | 6/2019 | Liu | H04L 5/0048 |
| 2019/0335522 A1 * | 10/2019 | Zhang | H04W 76/19 |
| 2020/0036427 A1 * | 1/2020 | Zhang | H04W 72/046 |
| 2020/0374960 A1 * | 11/2020 | Deenoo | H04B 7/0695 |
| 2021/0058131 A1 * | 2/2021 | Zhu | H04B 7/063 |
| 2021/0175957 A1 * | 6/2021 | Raghavan | H04B 7/0452 |
| 2022/0393750 A1 * | 12/2022 | Xu | H04W 76/19 |

OTHER PUBLICATIONS

International Search Report and Written Opinion dated Feb. 19, 2021 for International Application No. PCT/EP2020/067316 filed on Jun. 22, 2020, consisting of 9 pages.

* cited by examiner

*Primary Examiner* — Emmanuel Bayard
(74) *Attorney, Agent, or Firm* — Weisberg I.P. Law, P.A.

(57) ABSTRACT

Beam management performed for user equipment in a network. A method is performed by a network node. The method includes collecting performance feedback per beam upon having started to perform a current run of a beam management procedure. The performance feedback is derived from network statistics. The beam management procedure may include determining a candidate beam set from a set of available beams. The beam management procedure may include determining a beam switching command per user equipment for at least some of the user equipment.

20 Claims, 8 Drawing Sheets

BEAM MANAGEMENT FOR USER EQUIPMENT IN A NETWORK

CROSS-REFERENCE TO RELATED APPLICATION

This application is a Submission Under 35 U.S.C. § 371 for U.S. National Stage Patent Application of International Application Number: PCT/EP2020/067316, filed Jun. 22, 2020 entitled "BEAM MANAGEMENT FOR USER EQUIPMENT IN A NETWORK," the entirety of which is incorporated herein by reference.

TECHNICAL FIELD

Embodiments presented herein relate to a method, a network node, a computer program, and a computer program product for beam management performed for user equipment in a network.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low frequency bands could be needed to achieve sufficient network coverage for wireless devices and higher frequency bands (e.g. at millimeter wavelengths (mmW), i.e. near and above 6 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes, for example using pencil beams, might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). A BPL (i.e. both the beam used by the network node and the beam used by the terminal device) is expected to be discovered and monitored by the network using measurements on downlink reference signals, such as channel state information reference signals (CSI-RS) or synchronization signal block (SSB) signals, used for beam management.

However, there is still a need for improved beam management procedures.

SUMMARY

An object of embodiments herein is to provide efficient beam management.

According to a first aspect there is presented a method for beam management performed for user equipment in a network. The method is performed by a network node. The method comprises collecting performance feedback per beam upon having started to perform a current run of a beam management procedure. The performance feedback is derived from network statistics. The beam management procedure might comprise determining a candidate beam set from a set of available beams. The candidate beam set is based on information in terms of a user equipment performance indicator per beam, channel measurements per beam and on performance feedback per beam. The information is collected upon having performed at least one previous run of the beam management procedure. The performance feedback is used to, as part of determining the candidate beam set, determine a beam performance score per beam in the set of available beams. The beam management procedure might comprise determining a beam switching command per user equipment for at least some of the user equipment. The beam switching command is based on said information per user equipment. The performance feedback is used to determine when in time the beam switching command is to be executed per user equipment and to what beam in the candidate beam set a beam switch per user equipment is to be made when the beam switching command is executed.

According to a second aspect there is presented a network node for beam management performed for user equipment in a network. The network node comprises processing circuitry. The processing circuitry is configured to cause the network node to collect performance feedback per beam upon having started to perform a current run of a beam management procedure. The performance feedback is derived from network statistics. The network node might be configured to perform the beam management procedure by the processing circuitry being configured to cause the network node to determine a candidate beam set from a set of available beams. The candidate beam set is based on information in terms of a user equipment performance indicator per beam, channel measurements per beam and on performance feedback per beam. The information is collected upon having performed at least one previous run of the beam management procedure. The performance feedback is used to, as part of determining the candidate beam set, determine a beam performance score per beam in the set of available beams. The network node might be configured to perform the beam management procedure by the processing circuitry being configured to cause the network node to determine a beam switching command per user equipment for at least some of the user equipment. The beam switching command is based on said information per user equipment. The performance feedback is used to determine when in time the beam switching command is to be executed per user equipment and to what beam in the candidate beam set a beam switch per user equipment is to be made when the beam switching command is executed.

According to a third aspect there is presented a network node for beam management performed for user equipment in a network. The network node comprises a collect module configured to performance feedback per beam upon having started to perform a current run of a beam management procedure. The performance feedback is derived from network statistics. The network node might comprise a determine module configured to perform the beam management procedure by determining a candidate beam set from a set of available beams. The candidate beam set is based on information in terms of a user equipment performance indicator per beam, channel measurements per beam and on performance feedback per beam. The information is collected upon having performed at least one previous run of the beam management procedure. The performance feedback is used to, as part of determining the candidate beam set, determine a beam performance score per beam in the set of available beams. The network node might comprise a determine module configured to perform the beam management procedure by determining a beam switching command per user equipment for at least some of the user equipment. The beam switching command is based on said information per user equipment. The performance feedback is used to determine when in time the beam switching command is to be executed per user equipment and to what beam in the candidate beam set a beam switch per user equipment is to be made when the beam switching command is executed.

According to a fourth aspect there is presented a computer program for beam management performed for user equipment in a network, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects provide efficient beam management.

Advantageously these aspects enable a reduction in energy consumption at the user equipment due to reduced requirements for channel measurements as a result of the use of optimized candidate beam sets when determining the beam switching command.

Advantageously these aspects enable an increase in average cell throughput and/or spectral efficiency since the utilization of data symbols can be increased as a consequence of less demands for reference signal transmission for channel measurement purposes.

Advantageously these aspects enable a reduction in inter cell interference due to reduced reference signals transmissions.

Advantageously, due to the adaptive selection of the candidate beams, these aspects enable the beam switches to be more reliable.

Advantageously, with an up-to-date candidate beam set, the network node will be able to with an increased probability select the best serving beam to maintain the guaranteed bitrate of user equipment.

Advantageously, the use of performance feedback from previous beam switch decisions enables selection of robust beams in scenarios where frequent beam switches are redundant.

Advantageously, the use of performance feedback from previous beam switch decisions enable continuous learning which will further improve the candidate beam set and beam switch decisions.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
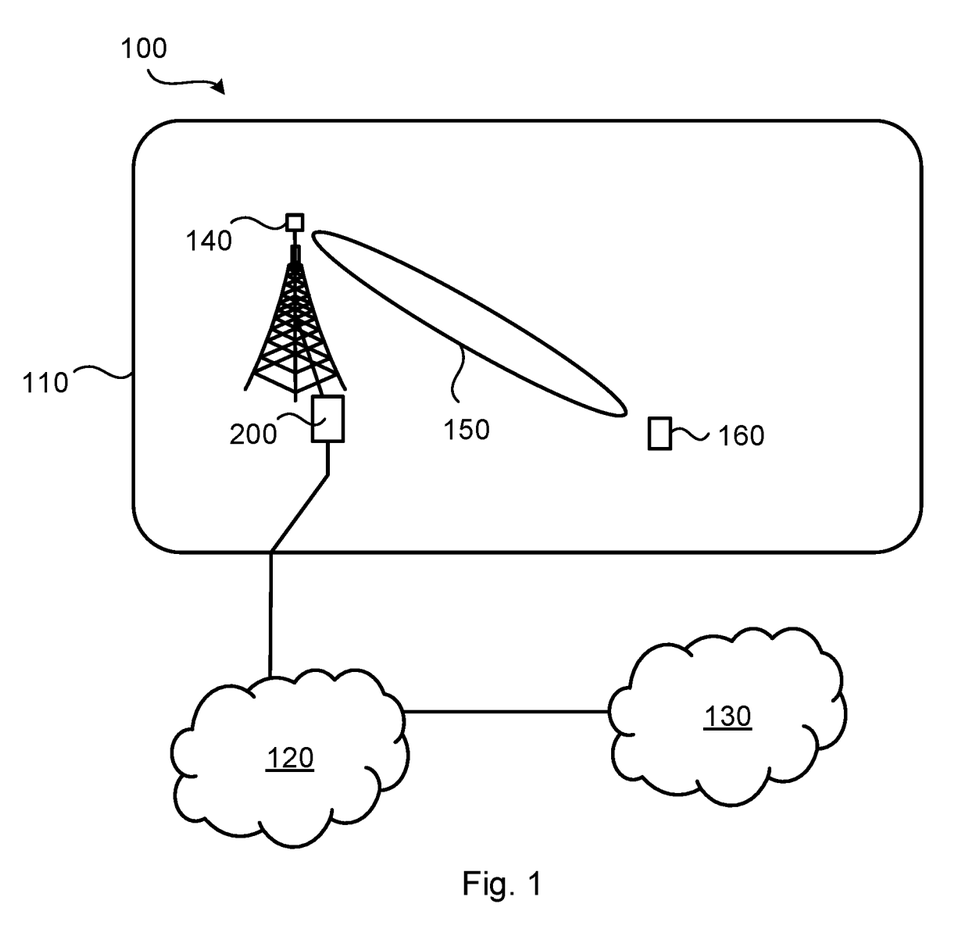
FIG. 1 is a schematic diagram illustrating a network according to embodiments.

FIG. 1 is a schematic diagram illustrating a network 100 where embodiments presented herein can be applied. The network 100 could be a third generation (3G) telecommunications network, a fourth generation (4G) telecommunications network, a fifth generation (5G) telecommunications network, or any evolvement thereof, and support any 3GPP telecommunications standard, where applicable.

The network 100 comprises a network node 200 configured to provide network access to user equipment, as represented by user equipment 160, in a (radio) access network 110. The (radio) access network 110 is operatively connected to a core network 120. The core network 120 is in turn operatively connected to a service network 130, such as the Internet. The user equipment 160 is thereby enabled to, via the network node 200, access services of, and exchange data with, the service network 130.

The network node 200 comprises, is collocated with, is integrated with, or is in operational communications with, a (radio) access network node 140. The network node 200 (via its (radio) access network node 140) and the user equipment 160 is configured to communicate with each other in beams, one of which is illustrated at reference numeral 150. In this respect, beams that could be used both as TX beams and RX beams will hereinafter simply be referred to as beams.

Examples of network nodes 200 are radio base stations, base transceiver stations, Node Bs, evolved Node Bs, gNBs, access points, access nodes, and backhaul nodes. Examples of user equipment 160 are wireless devices, mobile stations, mobile phones, handsets, wireless local loop phones, smartphones, laptop computers, tablet computers, network equipped sensors, network equipped vehicles, and so-called Internet of Things devices.

Terminology that will be useful in the following description of the embodiments will now be presented. A beam set is a set B of available beams in the system, where each element is an index to a beam. Formally, $B=\{B_i: i \in N \wedge i \leq N\}$, where N is the maximum number beams that the (radio) access network node 140 is configured to generate. A serving beam is a beam in the beam set on which data transfer is scheduled to a user equipment 160 in the network 100. A candidate beam is a beam which is a potential target of a beam switch for a given serving beam. Candidate beams are configured for power measurements from the user equipment 160. A candidate beam set is a set CB of beam indices of candidate beams for a given serving beam S. Formally, $CB_s=\{B_i: B_i \in B \wedge i \leq M \wedge i \neq B_s\}$, where M is the maximum size of the candidate beam set. A candidate beam set table is a table CBST of serving beam indices S, and a corresponding candidate beam set. Table 1 gives an example of a candidate beam set table.

TABLE 1

Example of a candidate beam set table

| Serving Beam Index | Candidate Beam Set |
|---|---|
| 0 | $\{B_i: B_i \in B \wedge i \leq M \wedge i \neq 0\}$ |
| 1 | $\{B_i: B_i \in B \wedge i \leq M \wedge i \neq 1\}$ |
| ... | ... |
| N-1 | $\{B_i: B_i \in B \wedge i \leq M \wedge i \neq N-1\}$ |

A target beam is a beam which is selected from the candidate beam set for a beam switch from a given serving beam.

As noted above there is still a need for improved beam management procedures. In further detail, a static configuration of candidate beam sets may not be suitable for (radio) access network nodes 140 serving user equipment 160 with uneven mobility. In such cases, there may be quality of service degradation and/or call drops when the (radio) access network node 140 is commanded to switch to an undesired target beam. Also, with a static configuration of candidate beam sets, a user equipment 160 might perform redundant measurements, causing high energy consumption and reduced spectrum efficiency. Further, performing a beam switch whenever there is a beam with higher reported power than the currently used serving beam might lead to unnecessary beam switches.

The embodiments disclosed herein therefore relate to mechanisms for beam management performed for user equipment 160 in a network 100. In order to obtain such mechanisms there is provided a network node 200, a method performed by the network node 200, a computer program product comprising code, for example in the form of a computer program, that when run on a network node 200, causes the network node 200 to perform the method.

Figure 2:
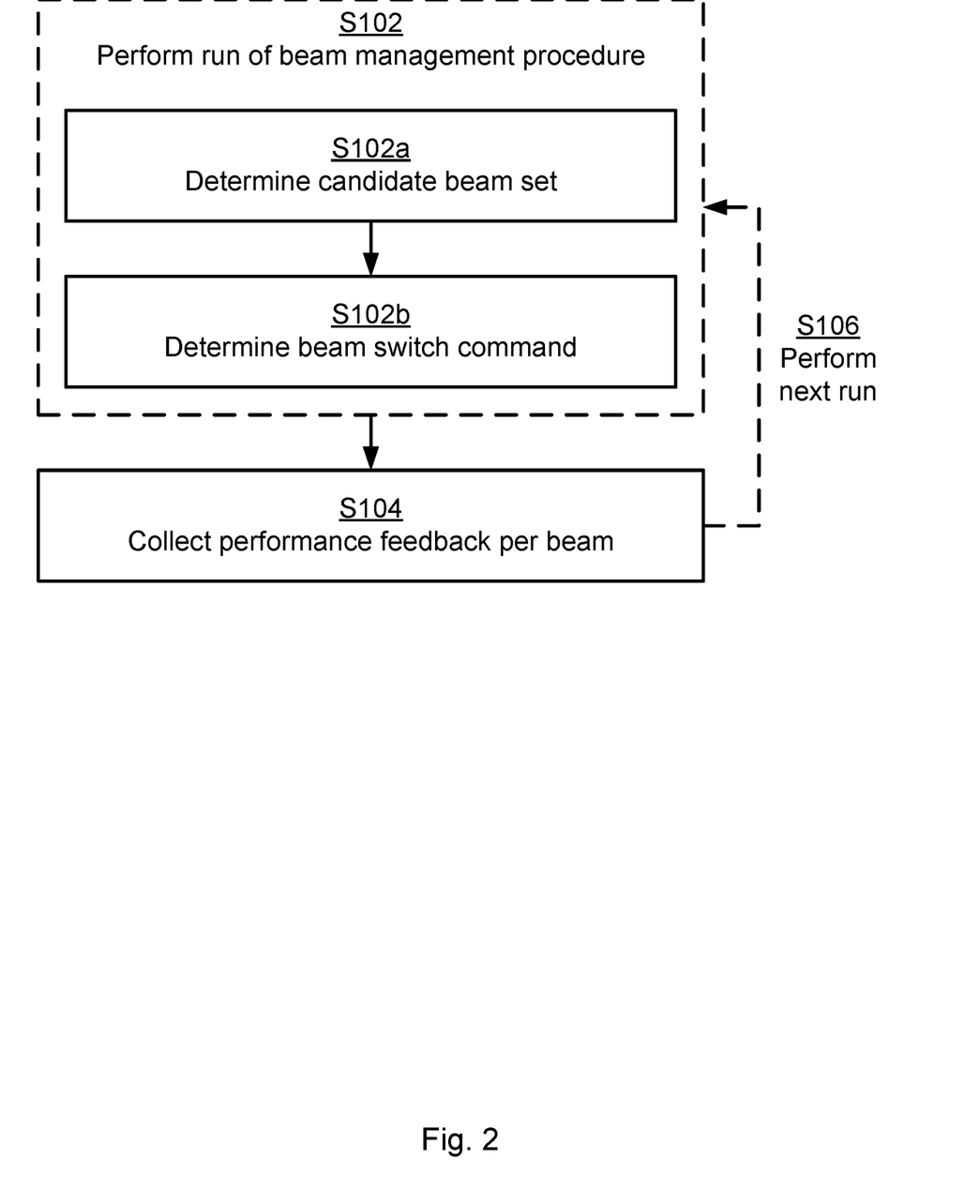
FIG. 2 is a flowchart of methods according to embodiments.

FIG. 2 is a flowchart illustrating embodiments of methods for beam management performed for user equipment 160 in a network 100. The methods are performed by the network node 200. The methods are advantageously provided as computer programs 920.

In general terms, the method is based on collecting and using performance feedback when performing a beam management procedure that involves determining a candidate beam set and/or determining a beam switching command.

S104: The network node 200 collects performance feedback per beam 150 upon having started to perform a current run S102 of a beam management procedure. The performance feedback is derived from network statistics.

The beam management procedure comprises at least one of steps S102a, S102b:

S102a: The network node 200 determines a candidate beam set from a set of available beams. The candidate beam set is based on information in terms of a user equipment performance indicator per beam 150, channel measurements per beam 150 and on performance feedback per beam 150. In this respect, the information might have different weights and some but not all of the weights might be set to zero. The information is collected upon having performed at least one previous run of the beam management procedure. The performance feedback is used to, as part of determining the candidate beam set, determine a beam performance score per beam 150 in the set of available beams.

S102b: The network node 200 determines a beam switching command per user equipment 160 for at least some of the user equipment 160. The beam switching command is based on information per user equipment 160 in terms of user equipment performance indicator per beam 150 and per user equipment 160, channel measurements per beam 150 and per user equipment 160 and on performance feedback per beam 150 and per user equipment 160. The information is collected upon having performed at least one previous run of the beam management procedure. The performance feedback is used to determine when in time the beam switching command is to be executed per user equipment 160 and to what beam in the candidate beam set a beam switch per user equipment 160 is to be made when the beam switching command is executed.

Embodiments relating to further details of beam management performed for user equipment 160 in a network 100 as performed by the network node 200 will now be disclosed.

The thus collected performance feedback might then be used during a next run of the beam management procedure. That is, in some embodiments, the network node is configured to perform (optional) step S106:

S106: The network node 200 performs a next run of the beam management procedure based on the performance feedback collected upon having performed the current run S102 of the beam management procedure.

Further aspects of the performance feedback (as collected in step S104 and used in steps S102a, S102b, S106) will now be disclosed.

As disclosed above, the performance feedback is derived from network statistics. There could be different ways for the network node 200 to obtain the network statistics. In some embodiments, the network statistics is received from control layer signalling in the network 100. There could be different examples of network statistics. In some non-limiting examples, the network statistics pertains to at least one of: user equipment ID (where ID is short for identity), time of a beam switch having been performed, success/failure indication of a beam switch having been performed, the serving beam index after execution of the beam switching command, the RSRP for the serving beam after execution of the beam switching command, the serving beam index before execution of the beam switching command, the RSRP for the serving beam before execution of the beam switching command.

There could be different types of performance feedback derived from the network statistics. In some non-limiting examples, the performance feedback per beam 150 pertains to at least one of: the (average) number of ping pong switches per beam 150, the (average) number of beam switch failures per beam 150, the (average) number of call drops per beam 150.

In some embodiments, the performance feedback per beam 150 is a weighted sum of the (average) number of ping pong switches per beam 150, the (average) number of beam switch failures per beam 150, and the (average) number of call drops per beam 150. In some non-limiting examples, weights used in the weighted sum are determined through localized supervised learning.

In some embodiments, the user equipment performance indicator per beam 150 represents a weighted sum of at least two user equipment performance indicators per beam 150. Non-limiting examples of user equipment performance indicators are (average) values of: Block Error Rate (BLER), Channel Quality Indicator (CQI), Rank Indicator (RI), user throughput, spectral efficiency, Modulation and Coding Scheme (MSC), Radio Link Control (RLC) buffer status.

Figure 3:
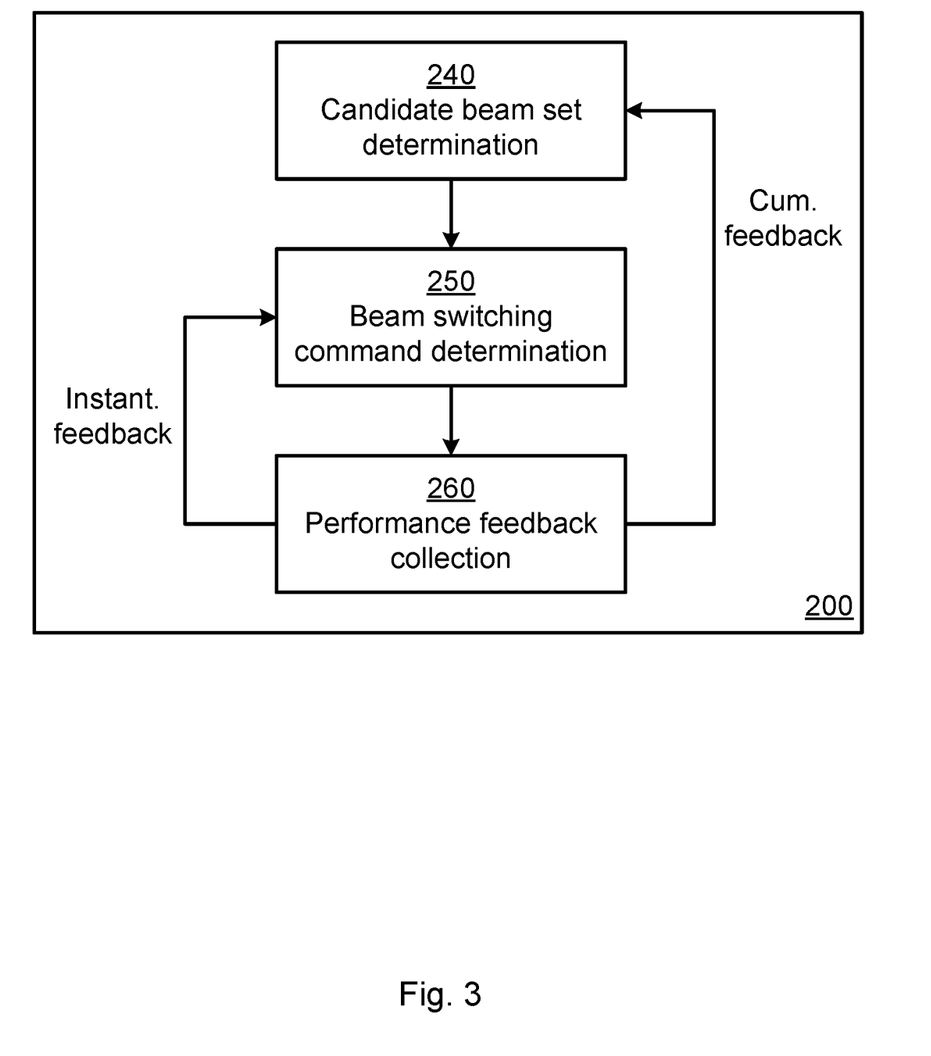
FIGS. 3 and 6 are block diagrams of a network node according to an embodiment.

Reference is next made to FIG. 3. FIG. 3 illustrates a block diagram of the network node 200 comprising a candidate beam set determination block 240, a beam switching command determination block 250, and a performance feedback collection block 260. In general terms, the candidate beam set determination block 240 is configured to implement step S102a, the beam switching command determination block 250 is configured to implement step S102b, and the performance feedback collection block 260 is configured to implement step S104. Further aspects of these blocks will now be described in turn.

The candidate beam set determination block 240 is configured to, periodically, optimize the candidate beam of each serving beam, so that only the best candidate beams are part of the candidate beam. Optimization might be performed by considering cumulative user equipment performance indicator, cumulative channel measurements, and cumulated performance feedback. That is, in some embodiments, the candidate beam set is determined based on a cumulative user equipment performance indicator. The candidate beam set might be determined based on cumulated performance feedback as collected from having performed at least two previous runs of the beam management procedure.

The beam switching command determination block 250 is configured to determine a beam switching command after a comprehensive assessment of instantaneous user equipment performance indicator, instantaneous channel measurements, and instantaneous performance feedback. That is, in some embodiments, the beam switching command is determined based on an instantaneous user equipment performance indicator and instantaneous channel measurements. The beam switching command might be determined based on instantaneous performance feedback collected upon having performed only the recent-most previous run (i.e., the last run) of the beam management procedure. If a beam switch is made, the beam switch is made to one of the beams in the candidate beam set.

The performance feedback collection block 260 is configured to collect performance feedback. The performance feedback might be represented by a set of performance counters. These performance counters represent the resulting impact on the network performance resulting from execution of the beam switching command. The performance counters are provided as a performance feedback to the candidate beam set determination block 240 and the beam switching command determination block 250 for optimization of future candidate beam set determination and beam switching command determination.

Figure 4:
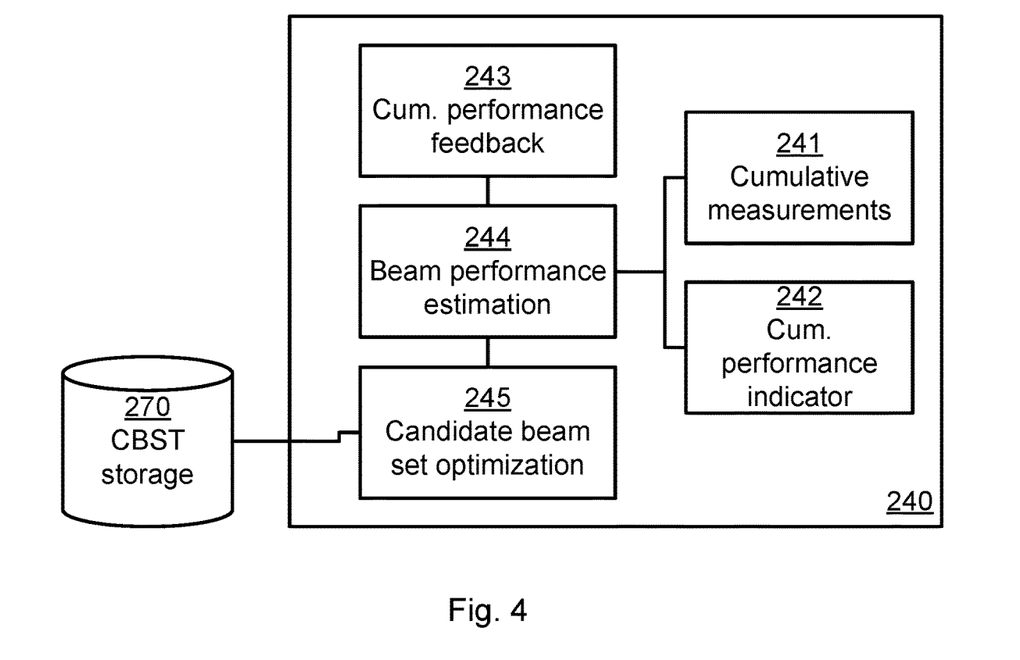
FIG. 4 is a block diagram of a candidate beam set determination block according to an embodiment.

Further aspects of the candidate beam set determination (as in step S102a) will now be disclosed with reference to FIG. 4. FIG. 4 is a block diagram of the candidate beam set determination block 240. A beam performance estimation block 244 takes as input information provided by a cumulative performance indicator block 242, information provided by a cumulative measurements block 241, and information provided by a cumulative performance feedback block 243. The beam performance estimation block 244 uses this information to estimate the beam performance per beam and provide this information to a candidate beam set optimization block 245. Details of theses blocks will be disclosed next. The candidate beam set determination block 240 is operatively connected to a CBST storage 270 for storage of optimized candidate beam sets, as provided from the candidate beam set optimization block 245.

Details of the cumulative performance indicator block 242 will be disclosed next. Examples of user equipment performance indicators have been disclosed above. The user equipment performance indicators indicate performance of the beam in terms of how well the QoS of user equipment which were served by this beam was preserved. The cumulative performance indicator block 242 is configured to determine a cumulative value $\alpha$ of the user equipment performance indicators per beam and provide this value to the candidate beam set determination block 240. The cumulative value $\alpha$ of the user equipment performance indicators per beam might be determined through a dimensionality reduction function on the user equipment performance indicators:

$$\alpha = \text{DIMENSION\_REDUCTION\_FUNC1}(\text{UE Performance indicators})$$

One non-limiting example implementation of this DIMENSION_REDUCTION_FUNC1 is a weighted sum of all the user equipment performance indicators. The weights can be fined tuned through localized supervised learning.

Details of the cumulative measurements block 241 will be disclosed next. Examples of channel measurements have been provided above. The cumulative measurements block 241 is configured to collect channel measurements and provide cumulative channel measurements to the candidate beam set determination block 240. In this respect, each user equipment 160 performs periodic channel measurements on the candidate beam set and reports the measurements in a measurement report. The user equipment 160 reports the measured signal quality for the best N beams from the currently used candidate beam set in the measurement report. The value of N and the periodicity of the measurement reports might be configured by control layer signalling. The measurement reports might be stored in a first-in first-out (FIFO) queue at the cumulative measurements block 241 and be processed in the order of their arrival. These measurement reports are collected by the cumulative measurements block 241. Non-limiting examples of channel measurements are RSRP and RSRQ.

Details of the cumulative performance feedback block 243 will be disclosed next. Examples of performance feedback have been provided above. The cumulative performance feedback block 243 obtains performance feedback from the performance feedback collection block 260 every $\delta$ interval. The cumulative performance feedback block 243 is configured to determine a cumulative beam switch feedback value $\gamma$ per beam and provide this value to the candidate beam set determination block 240. The cumulative beam switch feedback value γ might be determined through a dimension reduction function on the performance feedback:

γ=DIMENSION_REDUCTION_FUNC2(Performance feedback)

One non-limiting example implementation of this DIMENSION_REDUCTION_FUNC2 is a weighted sum of all the performance feedback. The weights can be fined tuned through localized supervised learning.

Details of the beam performance estimation block 244 will now be disclosed. As disclosed above, the beam performance estimation block 244 uses information from the cumulative performance indicator block 242, the cumulative measurements block 241, and the cumulative performance feedback block 243 as input to estimate the beam performance per beam. The beam performance per beam is represented by the beam performance score per beam. The beam performance score might be regarded as an indicator of how well a beam is performing from performance and measurement perspective. A high beam performance score implies a high-quality beam and vice versa. The beam performance score might be determined based on the cumulative value α of the user equipment performance indicators per beam, the cumulative beam switch feedback value γ per beam and a beam quality score β per beam. Hence, in some aspects the beam performance score BPS can be determined as:

$$BPS = W1 \cdot \alpha + W2 \cdot \beta - W3 \cdot \gamma,$$

where W1, W2, W3 are weights that can be dynamically adjusted depending on the performance feedback. That is, in some embodiments, the beam performance score per beam 150 is determined as a weighted sum of the user equipment performance indicator, the channel measurements, and the performance feedback, and the performance feedback is used to determine weights of the weighted sum. As disclosed above, some, but not all, of the weights might be set to zero.

The beam quality score β indicates the aggregated quality of the beam as perceived by the user equipment 160 over time. The beam quality score β might be determined either by the beam performance estimation block 244 or the cumulative measurements block 241. Thus, in some embodiments, the cumulative channel measurements per beam 150 represent a beam quality score per beam 150 indicating aggregated quality per beam 150 as perceived by the user equipment 160 over time. Aspects of how the beam quality score per beam 150 might be determined will be disclosed next. In some embodiments, the beam quality score per beam 150 is dependent on: whether a measurement report for the beam has been received or not, an absolute quality of the beam, a relative quality of the beam compared to other beams in the set of available beams, whether the quality of the beams has increased or decreased in comparison to a previous recent-most measurement report for the beam.

Whether a measurement report for the beam has been received or not represents a first condition. Aspects of this first condition will now be disclosed. In this respect, if the candidate beam j is not reported in the measurement report i of user equipment l then the beam quality score is updated as follows:

$$\text{Beam\_Quality\_Score}_{l,j,i} = \text{Beam\_Quality\_Score}_{l,j,i} - \delta_{E1},$$

where $\delta_{E1}$ is a deduction factor for the first condition. If the condition is not fulfilled, then the beam quality score is not updated.

The absolute quality of the beam represents a second condition and might indicate if the signal quality of a given candidate beam is greater or lesser than a threshold value. In this respect, it might be checked whether the signal quality λ of candidate beam j in the measurement report i of user equipment l is greater than, or equal to, a threshold value $\text{Th}_{E2}$. If so, then:

$$\text{Beam\_Quality\_Score}_{l,j,i} = \text{Beam\_Quality\_Score}_{l,j,i} + \delta_{E2,1},$$

and else:

$$\text{Beam\_Quality\_Score}_{l,j,i} = \text{Beam\_Quality\_Score}_{l,j,i} + \delta_{E2,2},$$

where $\delta_{E2,1} > \delta_{E2,2}$, and where $\delta_{E2,1}$ and $\delta_{E2,1}$ are increment factors for the second condition.

The relative quality of the beam compared to other beams in the set of available beams represents a third condition and might indicate how much better the beam quality of a given candidate beam is when compared to the rest of the candidate beams. In this respect, it might be checked whether the signal quality λ of candidate beam j in the measurement report i of user equipment l is greater than η candidate beams in the measurement report i of user l. If so, then:

$$\text{Beam\_Quality\_Score}_{l,j,i} = \text{Beam\_Quality\_Score}_{l,j,i} + \eta_j,$$

where, $\eta_j$ the number of candidate beams in N from measure report i whose signal quality is less than that of candidate beam j. If the condition is not fulfilled, then the beam quality score is not updated.

Whether the quality of the beams has increased or decreased in comparison to a previous recent-most measurement report for the beam represents a fourth condition and might indicate the consistency of the signal quality of a given candidate beam. In this respect, it might be checked how the signal quality $\lambda_{curr}$ of candidate beam j in the measurement report i of user equipment l is related to the signal quality $\lambda_{prev}$ of candidate beam j in the previous measurement report i of user equipment l. If $\lambda_{curr,j} \geq \lambda_{prev,j}$ then:

$$\text{Beam\_Quality\_Score}_{l,j,i} = \text{Beam\_Quality\_Score}_{l,j,i} + \delta_{E4,1},$$

and else:

$$\text{Beam\_Quality\_Score}_{l,j,i} = \text{Beam\_Quality\_Score}_{l,j,i} - \delta_{E4,2},$$

where $\delta_{E4,1}$ is an increment factor and $\delta_{E4,2}$ is a deduction factor for the fourth condition.

Details of the candidate beam set optimization block 245 will be disclosed next. The candidate beam set optimization block 245 might be configured to perform periodic optimization of the candidate beam set.

The periodicity of the optimization might be controlled by control layer signalling, for example depending on the number of connected user equipment 160 in the network 100. The higher the number of connected user equipment 160, then higher the number of measurement reports will be and the lower the periodicity might be and vice versa. As disclosed above, the estimated beam performance per beam is provided to the candidate beam set optimization block 245 from the beam performance estimation block 244. The candidate beam set optimization block 245 might use online learning of the best candidate beams set for each serving beam through the beam performance score. The candidate beam set optimization block 245 might use exploration and exploitation strategies based on the beam performance score to determine the optimized candidate beam sets. In this respect, in exploitation, accumulated knowledge in the form of the beam performance score is used to select the best candidate beams for the serving beam. In exploration, candidate beams which are not part of the most recently determined candidate beam set are used. Various exploration strategies exist, from random selection or greedy selection to stochastic techniques. That is, in some embodiments, the candidate beam set for the current run S102 of the beam management procedure comprises first beams selected from the beams of the candidate beam set for the most-recent previous run of the beam management procedure, and second beams not selected from the candidate beam set for the most-recent previous run of the beam management procedure. In some aspects, the number of beams selected via exploitation and/or the number of beams selected via exploration is determined from the performance feedback. That is, in some embodiments, the performance feedback is used to determine at least one of: how many first beams, how many second beams, fraction between first beams and second beams to include in the candidate beam set for the current run S102 of the beam management procedure.

Figure 5:
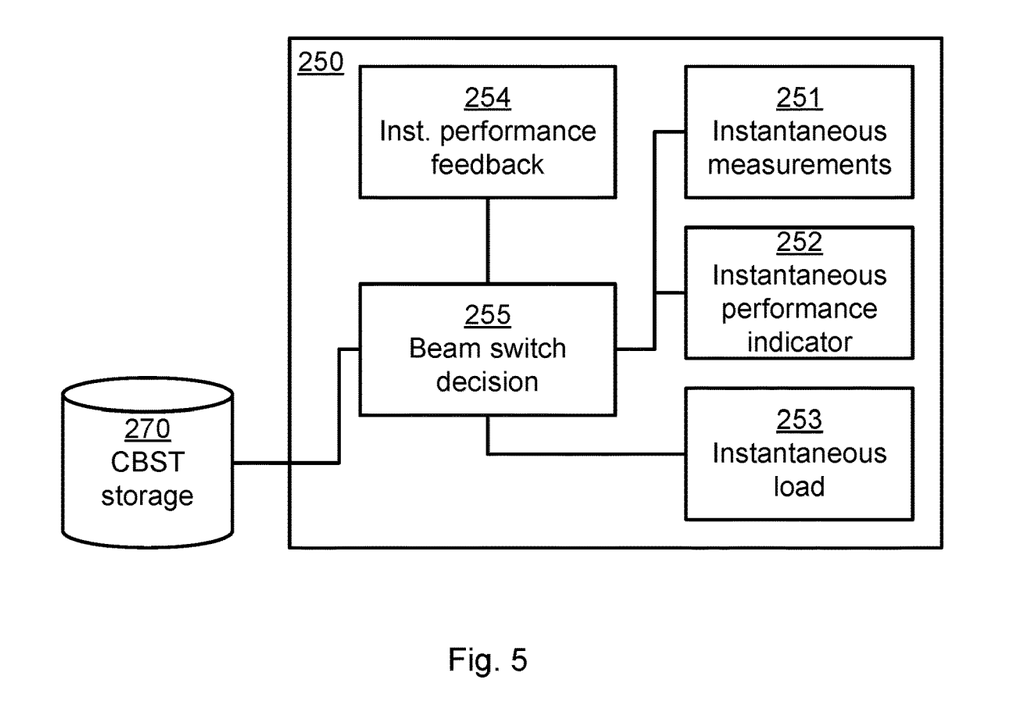
FIG. 5 is a block diagram of a beam switching command determination block according to an embodiment.

Further aspects of the beam switch command (as in step S102b) will now be disclosed with reference to FIG. 5. FIG. 5 is a block diagram of the beam switching command determination block 250. A beam switch decision block 255 takes as input information provided by an instantaneous performance indicator block 252, information provided by an instantaneous measurements block 251, information provided by an instantaneous load block 253 and information provided by an instantaneous performance feedback block 254. Details of theses blocks will be disclosed next. The beam switching command determination block 250 is operatively connected to the CBST storage 270 for retrieval of stored optimized candidate beam sets, as provided by the candidate beam set optimization block 245 in the candidate beam set determination block 240. The beam switching command determination block 250 uses the obtained information to determine a beam switching command for the candidate beam sets.

Details of the instantaneous performance indicator block 252 will be disclosed next. Examples of user equipment performance indicators have been disclosed above. The instantaneous performance indicator block 252 is configured to determine an instantaneous value of the user equipment performance indicators per beam as currently used in the network 100 and provide this value to the beam switching command determination block 250. The instantaneous performance indicators can be obtained by per user equipment 160 monitoring the performance on the current serving beam. The instantaneous value of the user equipment performance indicators per beam might be determined through a dimensionality reduction function on the user equipment performance indicators.

Details of the instantaneous measurements block 251 will be disclosed next. Examples of channel measurements have been provided above. The instantaneous measurements block 251 is configured to collect channel measurements and provide instantaneous channel measurements to the beam switching command determination block 250. As disclosed above, each user equipment 160 performs periodic channel measurements on the candidate beam set and reports the measurements in a measurement report. The instantaneous measurements can thus be obtained by monitoring the channel measurements of the current serving beam per user equipment and the candidate beams in the optimized candidate beam set determined for the current serving beam. The instantaneous measurements block 251 might process the measurement reports and then provide the instantaneous measurements per user equipment 160 and beam to the beam switching command determination block 250.

Details of the instantaneous load block 253 will be disclosed next. The instantaneous load block 253 is configured to obtain information of the instantaneous load per beam. Non-limiting examples of parameters that are characteristic of the instantaneous load per beam are number of user equipment 160 served per beam, amount of data transmitted per beam, etc. Information of the instantaneous load per beam is then provided to the beam switching command determination block 250. That is, in some embodiments, the beam switching command is determined based on instantaneous load per beam 150.

Details of the instantaneous performance feedback block 254 will be disclosed next. Examples of performance feedback have been provided above. The instantaneous performance feedback block 254 obtains instantaneous performance feedback. The instantaneous performance feedback block 254 is configured to determine an instantaneous beam switch feedback value per beam and provide this value to the beam switching command determination block 250. The instantaneous beam switch feedback value might be determined through a dimension reduction function on the performance feedback.

Information provided by the instantaneous performance indicator block 252, the instantaneous measurements block 251, the instantaneous load block 253 and the instantaneous performance feedback block 254 is then used by the beam switch decision block 255 to determine to which beams in the optimized candidate beam sets for each user equipment 160 is to be made, and when in time such a switch is to be made.

Aspects of when in time the beam switching command is to be executed will now be disclosed. When in time the beam switching command is to be executed is based on the instantaneous information as obtained by the beam switch decision block 255 as derived by thorough assessment of the instantaneous performance indicators, instantaneous channel measurements and instantaneous performance feedback. As a non-limiting example, decision logic for determining when in time the beam switching command is to be executed could be implemented as follows:

If number of ping pongs>threshold+hysterics, then
    delay beam switch for certain time period
endif
If channel measurement of current serving beam>threshold+hysteresis, then
    If collective performance on the current serving beam>threshold+hysteresis, then
        No beam switch;
    Else
        Trigger Beam switch
Else
    If there is at least one candidate beam with channel measurement>channel measurement of serving beam+hysteresis, then
        Trigger Beam switch.

Aspects of for which beams the beam switching command is to be executed will now be disclosed. Once a decision to switch beams have been taken, the next step is to decide where to switch (i.e., for which beams the beam switching command is to be executed). Switching to a candidate beam is based on instantaneous channel measurements of each candidate beam, the instantaneous load of each candidate beam, and the instantaneous performance feedback per candidate beam. As a non-limiting example, decision logic for determining for which beams the beam switching command is to be executed could be implemented as follows.

Find all candidate beams whose channel measurement is >channel measurement of serving beam+hysteresis,
  Within this list, find all the candidates with collective performance feedback<threshold+hysteresis,
    Within this list, find the candidate with its load<threshold,
      Switch to this beam.

Figure 6:
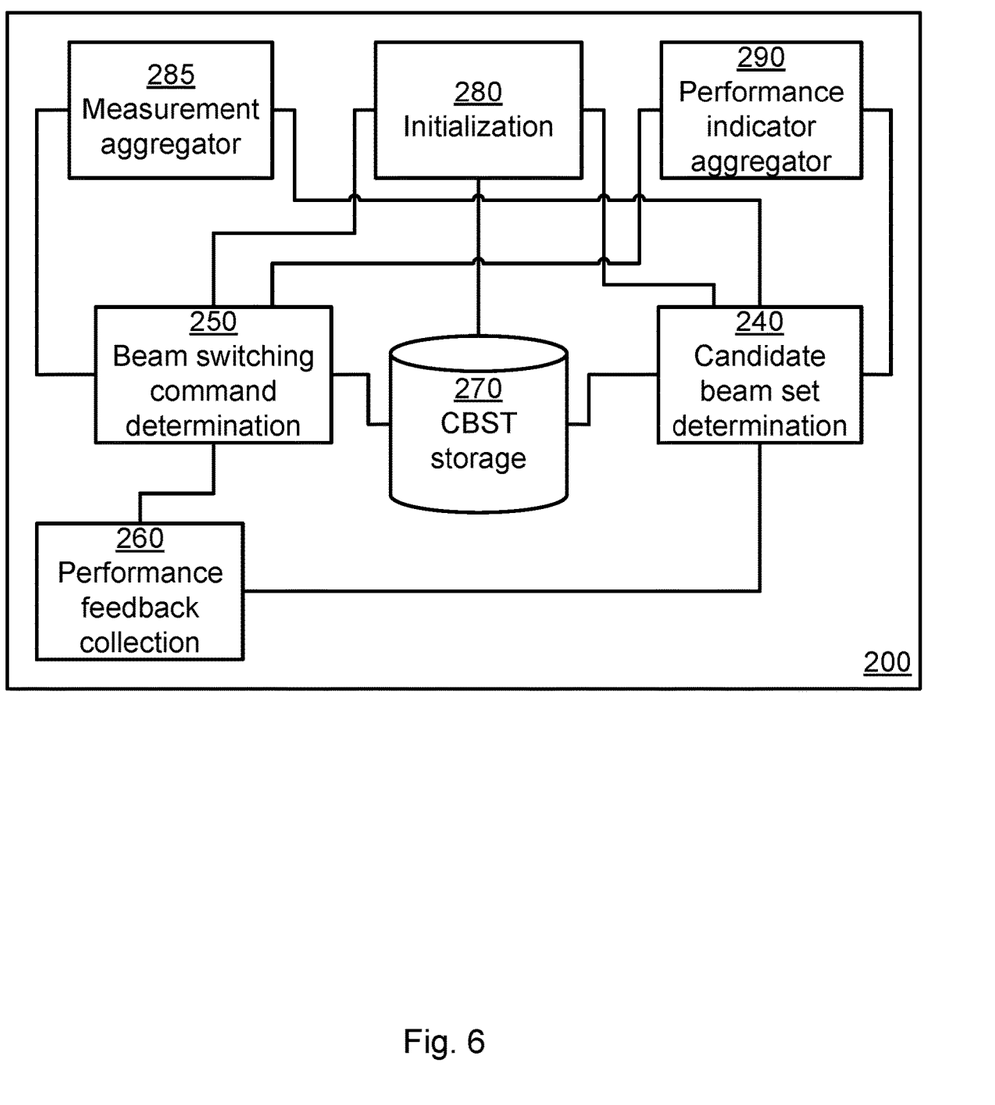

Reference is next made to FIG. 6. FIG. 6 illustrates a block diagram of the network node 200 similar to that of FIG. 3 and thus comprises the above disclosed candidate beam set determination block 240, beam switching command determination block 250, and performance feedback collection block 260, as well as the CBST storage 270. Description of the further blocks in the block diagram will now follow.

An initialization block 280 is configured to initialize CBST storage 270 as well as runtime constants and thresholds used by the candidate beam set determination block 240 and the beam switching command determination block 250. The initialization block 280 might receive configuration in the form of management layer signalling Non-limiting examples of parameters that could be used for initialization are: the set B of available beams that could be generated by (radio) access network node 140, the maximum number N of beams to be used by (radio) access network node 140, and the maximum size of a candidate beam set A measurement aggregator block 285 is configured to aggregate the above disclosed measurement reports from the user equipment 160. The measurement reports are received from the user equipment via control layer signalling. The measurement aggregator block 285 is configured to parse, filter, and share the measurement reports with the candidate beam set determination block 240 and the beam switching command determination block 250 as cumulative channel measurements and instantaneous channel measurements, respectively.

A performance indicator aggregator block 290 is configured to aggregate the above disclosed user equipment performance indicators for each beam in the set B. The user equipment performance indicators are received via control layer signalling. The performance indicator aggregator block 290 is configured to parse, filter, and share the user equipment performance indicators with the candidate beam set determination block 240 and the beam switching command determination block 250 as cumulative user equipment performance indicators and instantaneous user equipment performance indicators, respectively.

Figure 7:
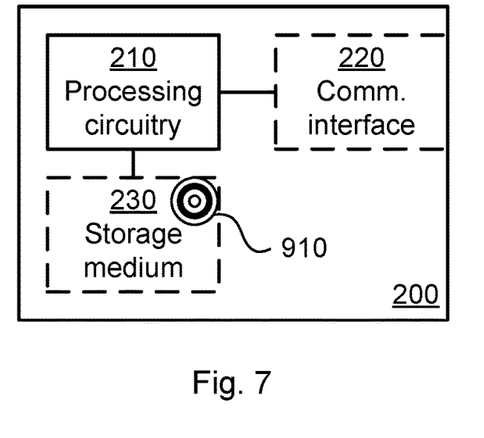
FIG. 7 is a schematic diagram showing functional units of a network node according to an embodiment.

FIG. 7 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other nodes, functions, entities, and devices, in the network 100. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 8:
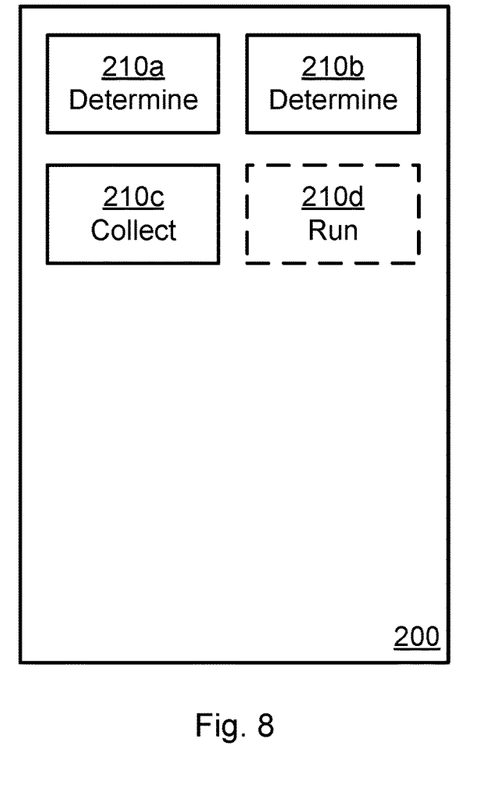
FIG. 8 is a schematic diagram showing functional modules of a network node according to an embodiment.

FIG. 8 schematically illustrates, in terms of a number of functional modules, the components of a network node 200 according to an embodiment. The network node 200 of FIG. 8 comprises a number of functional modules; a determine module 210a configured to perform step S102a, a determine module 210b configured to perform step S102b, and a collect module 210c configured to perform step S104. The network node 200 of FIG. 8 may further comprise a number of optional functional modules, such as a run module 210d configured to perform step S106. In general terms, each functional module 210a-210d may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

The network node 200 may be provided as a standalone device or as a part of at least one further device. For example, the network node 200 may be provided in a node of the (radio) access network or in a node of the core network. Alternatively, functionality of the network node 200 may be distributed between at least two devices, or nodes. These at least two nodes, or devices, may either be part of the same network part (such as the (radio) access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 7 the processing circuitry 210 may be distributed among a plurality of devices, or nodes. The same applies to the functional modules 210a-210d of FIG. 8 and the computer program 920 of FIG. 9.

Figure 9:
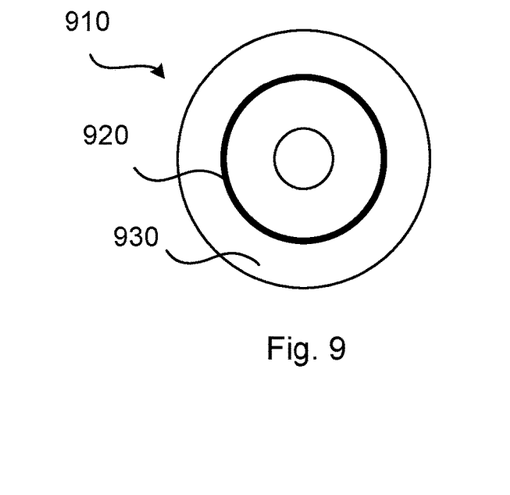
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

Figure 10:
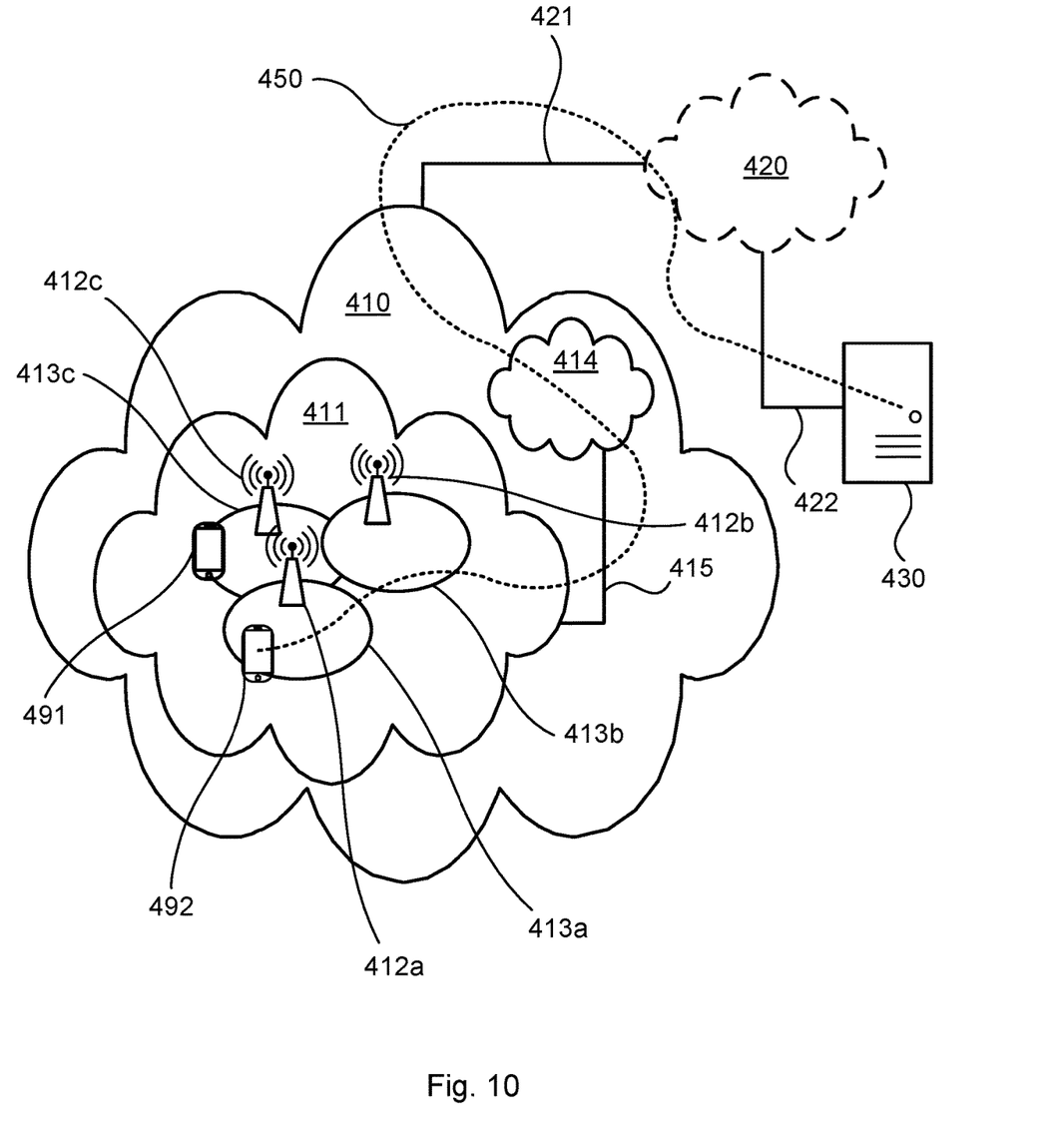
FIG. 10 is a schematic diagram illustrating a telecommunication network connected via an intermediate network to a host computer in accordance with some embodiments.

FIG. 10 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as (radio) access network 110 in FIG. 1, and core network 414, such as core network 120 in FIG. 1. Access network 411 comprises a plurality of (radio) access network nodes 412a, 412b, 412c, such as NBs, eNBs, gNBs (each corresponding to the network node 200 of FIG. 1) or other types of wireless access points, each defining a corresponding coverage area, or cell, 413a, 413b, 413c. Each (radio) access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the user equipment 160 of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 11:
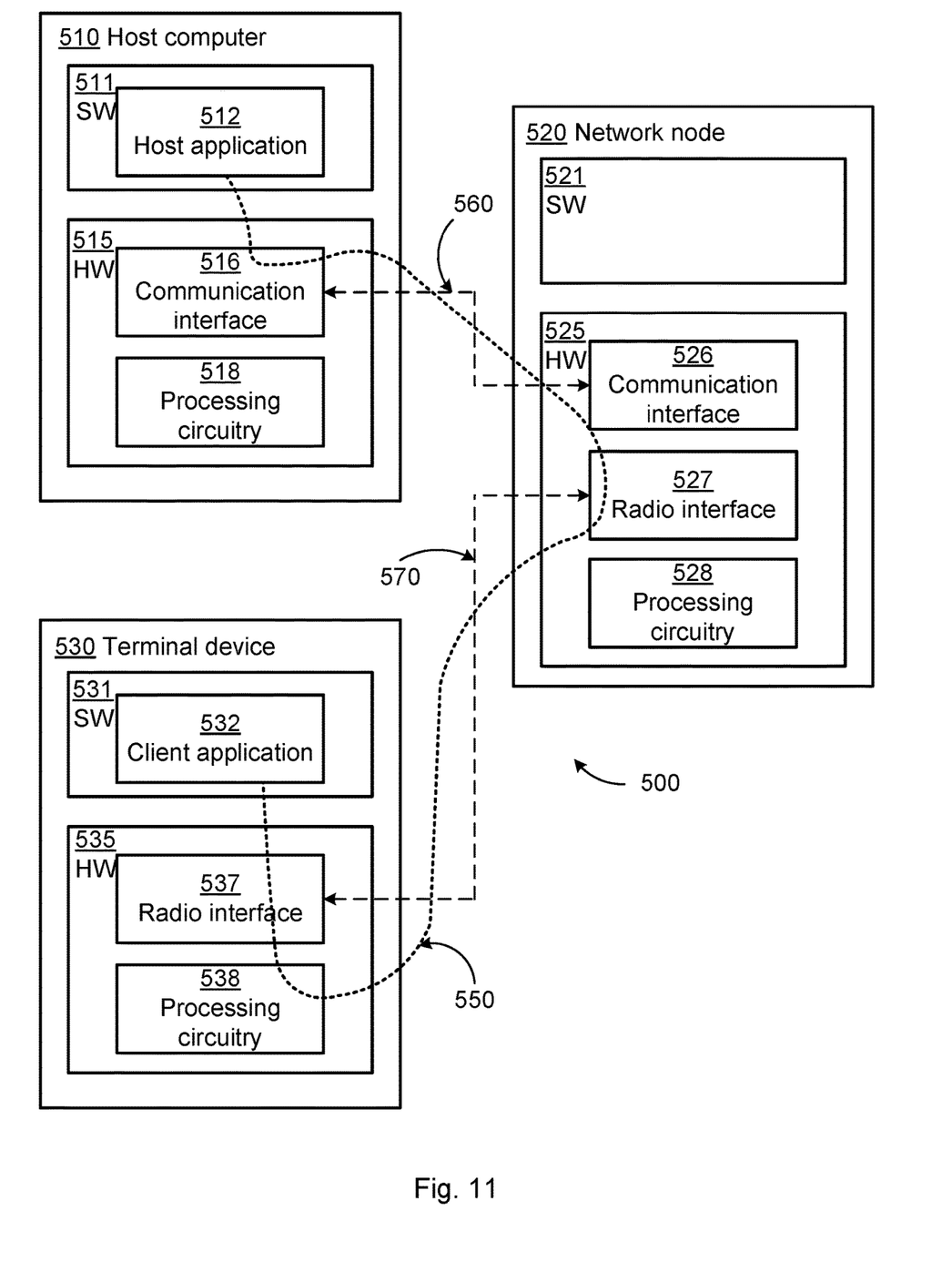
FIG. 11 is a schematic diagram illustrating host computer communicating via a radio base station with a terminal device over a partially wireless connection in accordance with some embodiments.

FIG. 11 is a schematic diagram illustrating host computer communicating via a (radio) access network node with a UE over a partially wireless connection in accordance with some embodiments. Example implementations, in accordance with an embodiment, of the UE, (radio) access network node and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the user equipment 160 of FIG. 1. In providing the service to the remote user, host application 512 may provide user data which is transmitted using OTT connection 550.

Communication system 500 further includes (radio) access network node 520 provided in a telecommunication system and comprising hardware 525 enabling it to communicate with host computer 510 and with UE 530. The (radio) access network node 520 corresponds to the network node 200 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by (radio) access network node 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of (radio) access network node 520 further includes processing circuitry 528, which may comprise one or more programmable processors, application-specific integrated circuits, field programmable gate arrays or combinations of these (not shown) adapted to execute instructions. (radio) access network node 520 further has software 521 stored internally or accessible via an external connection.

Communication system 500 further includes UE 530 already referred to. Its hardware 535 may include radio interface 537 configured to set up and maintain wireless connection 570 with a (radio) access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, (radio) access network node 520 and UE 530 illustrated in FIG. 11 may be similar or identical to host computer 430, one of network nodes 412*a*, 412*b*, 412*c* and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and (radio) access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to (radio) access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beam management performed for user equipment in a network, the method being performed by a network node, the method comprising:
   collecting performance feedback per beam upon having started to perform a current run of a beam management procedure, the performance feedback being derived from network statistics, the beam management procedure comprising at least one of:
   determining a candidate beam set from a set of available beams, the candidate beam set being based on information in terms of a user equipment performance indicator per beam, channel measurements per beam and on performance feedback per beam, the information being collected upon having performed at least one previous run of the beam management procedure, the performance feedback being used to, as part of determining the candidate beam set, determine a beam performance score per beam in the set of available beams; and
   determining a beam switching command per user equipment for at least a plurality of the user equipments, the beam switching command being based on the information per user equipment, the performance feedback being used to determine when in time the beam switching command is to be executed per user equipment and to what beam in the candidate beam set a beam switch per user equipment is to be made when the beam switching command is executed.

2. The method according to claim 1, further comprising: performing a next run of the beam management procedure based on the performance feedback collected upon having performed the current run of the beam management procedure.

3. The method according to claim 1, wherein the network statistics is received from control layer signalling in the network.

4. The method according to claim 1, wherein the network statistics pertains to at least one of: user equipment ID, time of beam switch, success/failure indication of beam switch, serving beam index after execution of the beam switching command, RSRP for serving beam after execution of the beam switching command, serving beam index before execution of the beam switching command, RSRP for serving beam before execution of the beam switching command.

5. The method according to claim 1, wherein the performance feedback per beam pertains to at least one of: number of ping pong switches per beam, number of beam switch failures per beam, number of call drops per beam.

6. The method according to claim 1, wherein the performance feedback per beam is a weighted sum of number of ping pong switches per beam, number of beam switch failures per beam, and number of call drops per beam.

7. The method according to claim 6, wherein weights used in the weighted sum are determined through localized supervised learning.

8. The method according to claim 1, wherein the user equipment performance indicator per beam represents a weighted sum of at least two user equipment performance indicators per beam.

9. The method according to claim 1, wherein the candidate beam set is determined based on cumulated performance feedback as collected from having performed at least two previous runs of the beam management procedure.

10. The method according to claim 1, wherein the beam performance score per beam is determined as a weighted sum of the user equipment performance indicator, the channel measurements, and the performance feedback, and wherein the performance feedback is used to determine weights of the weighted sum.

11. The method according to claim 1, wherein the candidate beam set is determined based on a cumulative user equipment performance indicator and cumulative channel measurements.

12. The method according to claim 11, wherein the cumulative channel measurements per beam represent a beam quality score per beam indicating aggregated quality per beam as perceived by the user equipment over time.

13. The method according to claim 12, wherein the beam quality score per beam is dependent on: whether a measurement report for the beam has been received or not, an absolute quality of the beam, a relative quality of the beam compared to other beams in the set of available beams, whether the quality of the beams has increased or decreased in comparison to a previous recent-most measurement report for the beam.

14. The method according to claim 1, wherein the candidate beam set for the current run of the beam management procedure comprises first beams selected from the beams of the candidate beam set for the most-recent previous run of the beam management procedure, and second beams not selected from the candidate beam set for the most-recent previous run of the beam management procedure.

15. The method according to claim 14, wherein the performance feedback is used to determine at least one of: how many first beams, how many second beams, fraction between first beams and second beams to include in the candidate beam set for the current run of the beam management procedure.

16. The method according to claim 1, wherein the beam switching command is determined based on instantaneous performance feedback collected upon having performed only the recent-most previous run of the beam management procedure.

17. The method according to claim 1, wherein the beam switching command is determined based on an instantaneous user equipment performance indicator and instantaneous channel measurements.

18. The method according to claim 1, wherein the beam switching command is determined based on instantaneous load per beam.

19. A network node for beam management performed for user equipment in a network, the network node comprising processing circuitry, the processing circuitry being configured to cause the network node to:
collect performance feedback per beam upon having started to perform a current run of a beam management procedure, the performance feedback being derived from network statistics, the network node being configured to perform the beam management procedure by the processing circuitry being configured to cause the network node to at least one of:
determine a candidate beam set from a set of available beams, the candidate beam set being based on information in terms of a user equipment performance indicator per beam, channel measurements per beam and on performance feedback per beam, the information being collected upon having performed at least one previous run of the beam management procedure, the performance feedback being used to, as part of determining the candidate beam set, determine a beam performance score per beam in the set of available beams; and
determine a beam switching command per user equipment for at least a plurality of the user equipments, the beam switching command being based on the information per user equipment, the performance feedback being used to determine when in time the beam switching command is to be executed per user equipment and to what beam in the candidate beam set a beam switch per user equipment is to be made when the beam switching command is executed.

20. A non-transitory computer storage medium storing a computer program for beam management performed for user equipment in a network, the computer program comprising computer code which, when run on processing circuitry of a network node, causes the network node to:
collect performance feedback per beam upon having started to perform a current run of a beam management procedure, the performance feedback being derived from network statistics, the beam management procedure comprises comprising at least one of:
determining a candidate beam set from a set of available beams, the candidate beam set being based on information in terms of a user equipment performance indicator per beam, channel measurements per beam and on performance feedback per beam, the information being collected upon having performed at least one previous run of the beam management procedure, the performance feedback being used to, as part of determining the candidate beam set, determine a beam performance score per beam in the set of available beams; and determining a beam switching command per user equipment for at least a plurality of the user equipments, the beam switching command being based on the information per user equipment, the performance feedback being used to determine when in time the beam switching command is to be executed per user equipment and to what beam in the candidate beam set a beam switch per user equipment is to be made when the beam switching command is executed.

* * * * *